United States Patent [19]

Cohen

[11] 4,059,130
[45] Nov. 22, 1977

[54] PROXIMITY SENSOR WITH ZERO ADJUSTMENT

[75] Inventor: Kenneth W. Cohen, Chesterland, Ohio

[73] Assignee: Bailey Meter Company, Wickliffe, Ohio

[21] Appl. No.: 509,456

[22] Filed: Sept. 26, 1974

Related U.S. Application Data

[63] Continuation of Ser. No. 397,537, Sept. 14, 1973, abandoned, which is a continuation of Ser. No. 208,143, Dec. 15, 1971, abandoned.

[51] Int. Cl.² .................. F15B 5/00; G01B 13/00
[52] U.S. Cl. .......................... 137/82; 73/37.5
[58] Field of Search ............... 73/37.5; 137/82, 85, 137/604; 235/201 FS; 251/24; 417/183, 184

[56] References Cited

U.S. PATENT DOCUMENTS

| 2,324,422 | 7/1943 | Patterson | 417/183 X |
|---|---|---|---|
| 3,127,764 | 4/1964 | Hudson | 73/37.5 |
| 3,455,318 | 7/1969 | Jenney | 137/85 |
| 3,643,688 | 2/1972 | Meinert | 417/183 |

*Primary Examiner*—Alan Cohan
*Assistant Examiner*—Gerald A. Michalsky
*Attorney, Agent, or Firm*—J. M. Maguire; John F. Luhrs

[57] ABSTRACT

A fluidic device having a sensing nozzle remotely mounted from an emitter assembly and communicating with it through a connecting tube. An adjustable nozzle assembly, located within the emitter assembly, is movable with respect to an outlet and aligned orifice to provide a zero level output signal from the outlet for various lengths of connecting tube. The nozzle assembly is also adjustable to provide a range independent zero level output signal for different pressure level sensitivities. A test jack communicates with the outlet to monitor the output signal and provide for adjusting the zero level output signal.

2 Claims, 2 Drawing Figures

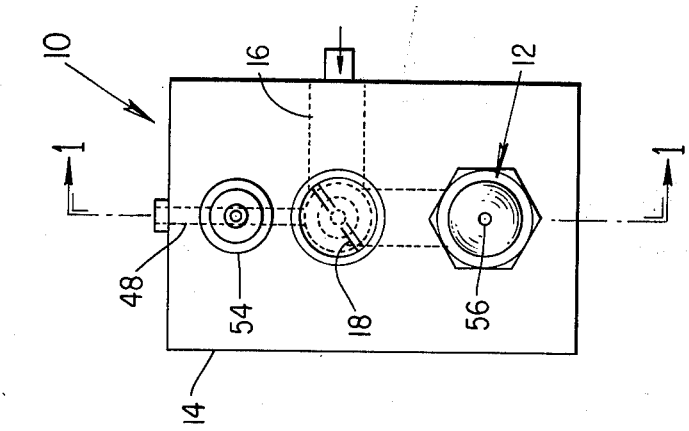
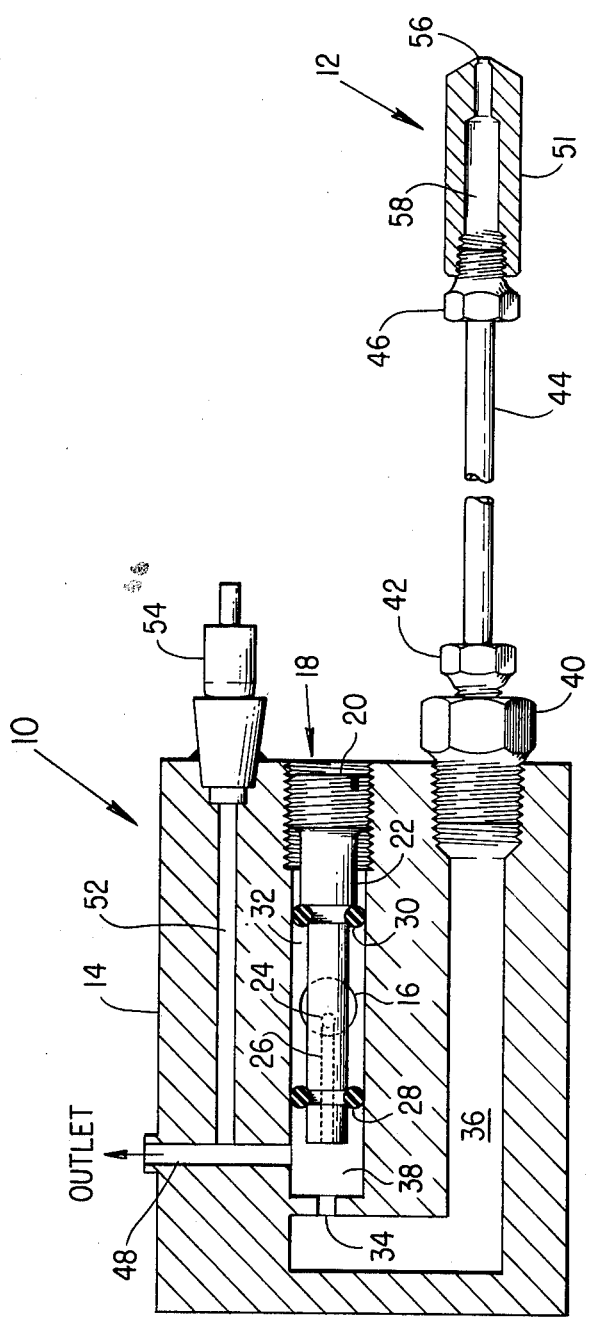

PROXIMITY SENSOR WITH ZERO ADJUSTMENT

This is a continuation, of application Ser. No. 397,537, filed Sept. 14, 1973, now abandoned, and which is a continuation of application Ser. No. 208,143 filed Dec. 15, 1971, now abandoned.

BACKGROUND OF THE INVENTION

1. Field of the Invention

This invention relates to improvements in fluidic proximity sensors in general and more particularly to a proximity sensor which provides high sensitivity with a zero output signal for various lengths of separation between the sensing nozzle and the emitter assembly.

2. Description of the Prior Art

Proximity sensors have heretofore comprised back pressure devices which provide a pressure output signal which is a function of the sensing nozzle clearance. To increase the sensing range of these devices the amount of air flowing through the sensing nozzle is increased.

One means of increasing the air flow from the sensing nozzle is to increase the bore diameter of the nozzle. An undesirable side effect is introduced, however, since the sensor's sensitivity to small objects is reduced. Furthermore, the output zero point changes and requires compensation.

Another means of increasing the air flow from the sensing nozzle is to increase the nozzle velocity. This is done by raising the supply pressure level. However, the output pressure zero point is raised and therefore requires some type of zero compensation. Continuous bleeding of the output to reduce it to a zero pressure level is possible. This type of zero adjustment is range coupled and is therefore impractical since a change in the zero output level also changes the range or sensitivity of the sensor.

Most proximity sensors have their sensing nozzles remotely mounted from the emitter assembly and have various lengths and diameters of tubing connecting the two. The resistance of the various possible connecting tubes is a function of their length and diameter and affects the back pressure transmitted from the sensing nozzle to the output chamber. This results in various zero level output signal compensation being needed depending upon the length and diameter of the tubing used.

SUMMARY OF THE INVENTION

In accordance with the present invention fluidic proximity sensor including an emitter assembly having an inlet, an outlet, and a back pressure chamber remotely located from the sensing nozzle is provided with an adjustable zero means for setting the output signal to zero, which adjustment is made independently of the sensing range of the proximity sensor allowing the sensitivity to be increased to a desired level before zero adjustment. This adjustment also allows compensation for variable lengths and diameters of tubing connecting the sensing nozzle to the emitter assembly. The adjusting means includes a movable nozzle located between the inlet and outlet of the emitter assembly which allows the output of the outlet port to be varied by moving the movable nozzle.

Further in accordance with the invention a fixed orifice is located in axial alignment with the movable nozzle between the output chamber and the back pressure chamber of the emitter assembly for the purpose of adjusting the pressure in the output chamber to allow a selected pressure to be obtained therein for a given pressure in the back pressure chamber.

Further in accordance with the invention a self-sealing test jack is provided to communicate with the outlet port through which test jack the outlet pressure may be monitored. This allows the output to be monitored while the zero adjustment is being made.

Further in accordance with the invention the adjusting means of the emitter assembly is aligned to provide a zero outlet signal from the emitter assembly for any predetermined back pressure condition in the sensing nozzle regardless of the amount of air flow through the sensing nozzle within a predetermined range.

The principal object of the invention is to provide a proximity sensor with variable sensitivity which may be increased by increasing fluid flow through the sensing nozzle and readjusting the output of the device to produce a zero output signal for unblocked operation. This allows the range of the device to be increased to a desired level and the zero output point to be readjusted without affecting the new range.

Another object of the invention is to provide a monitoring means for the output pressure which will not affect the zero point or the sensitivity of the device. The test jack facilitates the introduction of a monitoring device to be placed in line with the output when readjusting the zero output point.

BRIEF DESCRIPTION OF THE DRAWINGS

FIG. 1 is a partial cross-sectional elevational view of the proximity sensor taken along 1—1 in FIG. 2.

FIG. 2 is an end view of the proximity sensor.

DESCRIPTION OF THE PREFERRED EMBODIMENTS

Referring now to the drawings wherein the showings are for purposes of explaining the preferred embodiment and not for the purpose of limiting same, FIG. 1 shows an emitter assembly 10 connected to a remotely located sensing nozzle assembly 12 by a connecting tube 44. The connecting tube 44 is sealed to the nozzle assembly 12 by a coupling 46 and similarly to the emitter assembly by a coupling 42.

The emitter assembly 10 includes a body 14 which has machined or molded into it a sensing nozzle back pressure chamber 36, a supply inlet 16, an output chamber 38, an output passageway 48 and a test jack passageway 52. A fitting 40 screws into the threaded inlet of the nozzle back pressure chamber 36 and has provisions for accepting the coupling 42. A fixed orifice 34 is located in the back pressure chamber 36 near the output passageway 48 and separates the output chamber 38 from the back pressure chamber 36. The passageway 52 communicates with the passageway 48 and is sealed by a self-sealing test jack 54.

An adjustable nozzle assembly 18 is located in the output chamber 38 and is movable therein by screwing it in or out. The assembly 18 has a slotted head 20 which is threaded into the threaded inlet of the output chamber 38. A nozzle body 22 is connected to the head 20 and has an O-ring 30 and an O-ring 28 spaced near opposite ends of the body 22 and sealed with the walls of the output chamber 38 to define an input chamber 32 between them. The supply pressure inlet communicates with the chamber 32 to pressurize it thereby. A passageway 26 is bored inside of the nozzle body 22 which communicates with the input chamber 32 by way of a port 24. The passageway 26 exhausts into the output chamber 38.

The sensing nozzle assembly 12 has a body 51 which defines a passageway 58 and a sensing orifice 56. The passageway 58 communicates with the back pressure chamber 36 through the connecting tube 44.

OPERATION

In operation, the device is connected to supply pressure through the inlet 16 which pressurizes the chamber 32 in turn setting up fluid flow through the passageway 26 and exiting into the output chamber 38. This chamber 38 exhausts through the fixed orifice 34 into the back pressure chamber 36 and through the connecting tube 44 into passageway 58 and out from the sensing orifice to the atmosphere. If the orifice 56 is unobstructed, the output pressure sensed through the output passageway 48 is zero. As the sensing orifice flow is obstructed by an object entering the sensing range of the device, back pressure increases in the nozzle assembly and is transmitted back to the chamber 36 and proportionately to the output chamber 38. The closer the object sensed comes to the sensing orifice 56, the higher the output pressure becomes. Thus within a certain distance or range of the orifice 56, an analog pressure output signal is produced proportional to the position of the object sensed with respect to the orifice 56.

If the nozzle assembly 12 is moved to another location a different length of connecting tube may be required and the emitter assembly 10 then must be recalibrated. The changed resistance of the new length of connecting tube causes the zero output signal for unblocked sensor orifice 56 operation to shift. This shift is compensated for by adjusting the nozzle assembly 18.

A pneumatic test probe as described in the Kenneth W. Cohen et al U.S. Pat. Application Ser. No. 83,776, "Fluidic OnLine System Tester" now Pat. No. 3,705,535, can be used to monitor the output pressure by coupling the probe to the test jack 54. A gauge could also be used for the purpose of calibration in this manner.

The nozzle assembly 18 is screwed in or out, by rotating the slotted head 20 with a screwdriver, until the output pressure is zero as indicated by the test probe. As the sensing orifice flow starts impinging upon a sensed object, the back pressure in chamber 36 starts to increase and the pressure in chamber 38 also begins to rise, in excess of zero and proportionately.

Situations arise where the sensitivity of the device, i.e. the measurement range, must be increased. This is accomplished by increasing the fluid flow through the sensing nozzle 56. Of course, this increases the back pressure in the chamber 36 and the unobstructed orifice 56 zero pressure output point changes to some positive pressure value. Again the device is readjusted by adjusting the nozzle assembly 18 similarly as for a different connecting tube length. Since the nozzle assembly 18 position does not substantially affect the fluid flow through the device the zero adjustment is independent of the range of the device, and each may be adjusted separately.

Various modifications and additions will become obvious to persons skilled in the art upon reading this specification. It is my intention that such various modifications and additions be incorporated herein.

What I claim as new and desire to secure by Letters Patent of the United States is:

1. In a proximity sensor, the combination comprising an emitter assembly having a cylindrical passageway, a fixed orifice disposed in said passageway dividing the passageway into an output chamber and a b ack pressure chamber, a sensing nozzle connected to said back pressure chamber for wasting pressure fluid from the back pressure chamber in inverse proportion to the proximity of an object to the sensing nozzle, an orifice tube located within said output chamber axially aligned with said fixed orifice adapted to be connected to a source of pressure fluid and discharge a jet of pressure fluid through said fixed orifice into said back pressure chamber, and means for axially positioning said orifice tube to thereby vary the pressure in said output chamber for a given pressure in said back pressure chamber.

2. A proximity sensor as set forth in claim 1 wherein said orifice tube is provided with a closed end remote from said fixed orifice and having an outside diameter less than the diameter of said output chamber, axially spaced apart O-rings carried by said orifice tube bearing against the cylindrical wall of said output chamber to thereby provide a cylindrical annular chamber pressure sealed from said output chamber, an inlet port in said orifice tube between said O-rings for discharging pressure fluid from said annular chamber into said orifice tube, and a supply port in the wall of said output chamber for introducing pressure fluid into said annular chamber, and wherein said means for axially positioning said orifice tube comprises a collar formed on said orifice tube provided with external threads engaging internal threads on the wall of said output chamber whereby rotation of said collar in forward and reverse directions axially positions said orifice tube toward and away from said fixed orifice.

* * * * *